(12) United States Patent
Sofer

(10) Patent No.: US 6,916,630 B2
(45) Date of Patent: Jul. 12, 2005

(54) METHOD AND SPIRAL BIOREACTOR FOR PROCESSING FEEDSTOCKS

(76) Inventor: Samir S Sofer, 510 Franklin Av, Nutley, NJ (US) 07110

( * ) Notice: Subject to any disclaimer, the term of this patent is extended or adjusted under 35 U.S.C. 154(b) by 301 days.

(21) Appl. No.: 09/836,497

(22) Filed: Apr. 17, 2001

(65) Prior Publication Data

US 2001/0055802 A1 Dec. 27, 2001

Related U.S. Application Data

(63) Continuation-in-part of application No. 09/293,126, filed on Apr. 16, 1999, now abandoned, and a continuation-in-part of application No. PCT/US97/18749, filed on Oct. 22, 1996.

(51) Int. Cl.$^7$ .............................. B09B 3/00; C12M 1/00; C12M 3/00; C12N 1/00; C12P 1/00
(52) U.S. Cl. ...................... 435/41; 435/177; 435/243; 435/252.1; 435/262.5; 435/289.1; 435/395; 435/911
(58) Field of Search ..................... 435/41, 177, 243, 435/252.1, 262.5, 289.1, 395, 911, 176, 283.1

(56) References Cited

U.S. PATENT DOCUMENTS

| 4,178,239 | A | * | 12/1979 | Lowther | 210/15 |
| 4,689,302 | A | * | 8/1987 | Goldberg et al. | 435/293.2 |
| 4,937,196 | A | * | 6/1990 | Wrasidlo et al. | 435/297.2 |
| 5,237,115 | A | * | 8/1993 | Makovec et al. | 585/314 |
| 5,405,764 | A | * | 4/1995 | Harder et al. | 435/161 |

* cited by examiner

Primary Examiner—David M. Naff
Assistant Examiner—Deborah K. Ware
(74) Attorney, Agent, or Firm—Michael A. Mann; Nexsen Pruet Adams Kleemer, LLC

(57) ABSTRACT

A potential energy field flow bioreactor for processing a reagent includes a flow pathway, preferably in the form of a spiral, through which pathway is flowed reactant particles and at least one initial reagent adapted to react therewith. The reaction generates an energy potential difference between the beginning of said pathway and its end thereby polarizing the reactant particles, whereby they adhere to each other and become immobilized within the pathway.

17 Claims, 3 Drawing Sheets

METHOD AND SPIRAL BIOREACTOR FOR PROCESSING FEEDSTOCKS

RELATED APPLICATION

The present application is a continuation-in-part of case Ser. No. 09/293,126, filed Apr. 16, 1999, now abandoned, and PCT/US97/18749, filed Oct. 22, 1996.

FIELD OF THE INVENTION

The present invention relates to continuous or batch flow reactors

DISCUSSION OF THE PRIOR ART

In flow reactors, the distance between the flowing medium and the reactant bearing surface (or biocatalyst) is purposely kept very small in order to assure efficient contact between reactants and catalyst. In the patent to Goldberg and Chen (U.S. Pat. No. 4,689,302) a flow channel spacing is recommended in the range of from 0.0127 to 0.0762 cm or 0.005" to 0.030", referred to herein-below as the prior art cartridge.

When used with bacteria for oxidation of phenol as a model pollutant (Timothy L. Borkowski Quantitative Studies of an Immobilized Cell Oxidative Bioreactor, MS Env Sci New Jersey Institute of Technology (1995); Chad Sheng *Analysis of the Oxidation of Isotox® by Immobilized Bacteria*, MS Env Sci New Jersey Institute of Technology (1995) James Joseph Woods Aeration and Operation of an Immobilized Cell Oxidative Bioreactor, MS Env Sci New Jersey Institute of Technology (1995)), the prior art cartridge displayed substantial oxidation rates. However, it was believed that in accordance with the principles discussed below, a more efficient cartridge could be developed which would differ from the prior art cartridge in significant ways.

Conventional design techniques for flow reactors tend toward a very narrow spacing and high surface area to reduce diffusion of reactants toward, and of products away, from the reaction site. This design approach has the disadvantage of high pressure drops across the reactor, requiring costly pumps and utilities. The potential energy field (PEF) reactor uses the field strength to advantage, which for the spiral sheet reactor with oxidizing bacteria means much larger spacings than the range preferred and specifically claimed by Goldberg and Chen.

Both sheet thickness and porosity may affect the nature of the field buildup. Sheet thickness increases spacing, decreasing field intensity, and porosity tends to allow the radial movement of charged particles, allowing electric current flow.

The prior art shows that conventional thinking about flow reactor design teaches away from the approach of the present invention. In a commonly accepted immunology text, Kuby (Immunology, 2nd edition, New York: W. H. Freeman and Company (1994)) teaches that cells in culture grow into monolayers. This teaching is contrary to the thrust of the present invention, which holds that film density and hence film thickness (which can be much more than one layer thick), are determined by energy factors.

Perry and Chilton's internationally recognized handbook *Chemical Engineers' Handbook* 5th edition New York: McGraw-Hill Book Company (1973) teaches away from the present invention by stating that catalyst porosity is important, as is surface area per unit volume, the latter of which is higher for smaller particles. The position taken by the present invention is that reactant particle size and porosity are not the critical factors; rather, the over-all energy field drives the reaction.

Polk and Rostow (*Handbook of Biological Effects of Electromagnetic Fields* New York: CRC Press (1996)) state that electromagnetic fields affect biological systems. However, they do not teach how to quantify these effects nor how to use these effects to design, optimize, or control flow reactors.

Bensom, Grissom, and coworkers (*Magnetic field enhancement of antibiotic activity in biofilm forming Pseudomonas aeruginosa* ASA10 (Am Soc for Artif Int Organs) Journal (1994) M371) show that magnetic fields enhance gentamicin activity against bacteria, commenting that the cellular and mucoid components in a biofilm interact in a complex manner. They fail to teach how to quantify this behavior for use in biofilm or other reactors.

SUMMARY OF THE INVENTION

There is disclosed a process for the preparation of a reactor of a novel type designated as a potential energy field reactor. Such a reactor is useful for processing a reagent in aqueous or non-aqueous feedstocks with reactant particles adsorbed therein. The reagent is not limited in category, provided that it can make reactive contact with the reactant particles. The reagent may be a substance that the user wishes to convert into another useful substance or it may be a pollutant in the feed stock that the user desires to destroy or render harmless. The present invention shows that reactions may be controlled by self- or externally-generated magnetic fields.

This novel process comprises providing a flow pathway in a reactor which has at least one surface, then feeding reactant particles and at least one initial reagent adapted to react with these reactant particles into this pathway. In continuous flow reactors heretofore, other than fluid bed reactors, it has been customary to provide either a porous surface into which the reactant particles can be "locked", or to bond the particles to the surface of the reactor with linking agents.

It has been the surprising finding herein that by proper adjustment of the actual spacing in the reactor and utilization of an appropriate flow rate the reactant particles can be immobilized within the flow pathway without the "locking" means of the prior art. The key to this methodology is the surprising finding that when a reaction takes place in a flow reactor, an energy potential difference is generated between the beginning of said pathway and its end. This polarization may be electrical, magnetic or both. As a result of this energy field, the reactant particles become polarized, and these polarized particles align with each other and become immobilized within the pathway.

In the general method of setting up the reactor, reactant particles and the reagent are fed to the reactor until reactant particles adhere to each other to a sufficient extent to effectively adhere to the surface of the flow path. The feeding continues until the surface of the pathway is coated with a plurality of layers of the reactant particles.

While the invention is not limited thereto, a major type of reactant is a biocatalyst, this may be aerobic or anaerobic, and include biocatalysts selected from the group consisting of enzymes, bacteria, organelles, yeasts, leucocytes, hemocytes and fungi or the like or their products.

The feedstock may be aqueous or non-aqueous. While in many cases the initial reagent to set up the system is different from the reagent to be processed, the system is not so limited. The initial reagent may well be the reagent in the feedstock to be processed.

Where the reactant selected is bacteria, it may be either aerobic or anaerobic bacteria. Where the reactant chosen is aerobic bacteria, the initial reagent is then preferably an oxidizing agent, such as oxygen or even a pollutant to be degraded. A highly suitable reactant in this area is activated sludge, suitably screened to have a particle size of less than 300 microns.

The invention also comprises potential energy field reactors made by any of the foregoing procedures as well as methods of processing one or more components of a feedstock wherein the method includes the step of feeding said feedstock to such a reactor. An example of a such a procedure comprises removing phenolic components from aqueous feedstock wherein the method includes the step of feeding feedstock into a reactor containing activated sludge, suitably by recycling said feedstock through said reactor until no measurable amount of phenolic components is detectable. Other uses will be discussed below.

The use of the potential energy field (PEF) principles demonstrated herein leads to the design of a new cartridge with dramatically higher performance. The new method increases the average reactant density, such as a bacterial packing density, by several fold by taking into consideration PEF dynamics of the reaction, preferably an oxidation reaction, itself.

The PEF reactor is designed on the basis of totally different principles from reactors of the prior art used for the same purpose. The reactants or catalysts need not be chemically or mechanically locked or fixed in place. The potential energy field, built for example by oxidizing bacteria, determines the packing of the cells, which in this case attach by themselves and form a thicker film than is normally obtained by chemical means. Spacing, sheet thickness, and porosity are not restricted. In fact, sheet porosity is not relevant.

There are three determinative variables for this method. The first variable is the driving force of the reaction, which may be represented by a concentration or concentration difference, or other measurable parameter such as such as temperature, pH, pressure, color, etc.

The second determinative variable represents the energy field intensity, I, which is determined by calculation.

The third determinative variable is a reactor parameter, such as the hydraulic density, which is a representation of the biocatalyst density. Reaction rates and/or other critical reactor parameters may be selected in the alternative.

Combinations of the above parameters may also be used to obtain any or all of the three determinative variables.

The present reactor has numerous advantages in terms of efficiency and effectivity over not only other reactors but also other bioreactors as well. Moreover, in some applications it can be used to produce useful fuel such as ethanol and carbon dioxide, for stimulating plant growth, from sugars. This application contrasts starkly with the production of fuels from fossil fuels which may contribute to the so-called "greenhouse" effect.

DETAILED DESCRIPTION OF PREFERRED EMBODIMENTS

While not wishing to be bound by theory, it is believed that every reaction has a dynamic energy pattern made up of electrical, magnetic, and chemical potential energies in addition to the more conventional internal energy terms. By monitoring a measurable parameter such as concentration or concentration difference, one obtains an indication of the relative strength of this field. This parameter is used to calculate a field intensity profile. A reactant concentration, preferably a biocatalyst packing density, is calculated for low and high packings, as are film thickness and bed expansion volume. A decision is made to increase or decrease the field intensity on the basis of reactant concentration, preferably by bacterial bed expansion within the biocatalyst film. A configurational parameter such as wall spacing is changed and the field intensity profile re-calculated. A new reactor is designed and the process is repeated as necessary.

Figure 1:
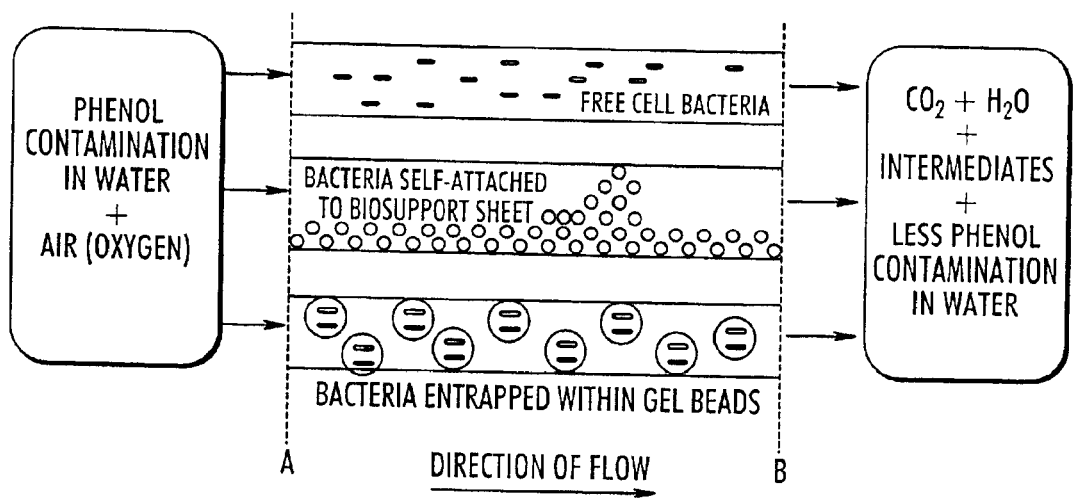
FIG. 1 is a schematic illustration of the principles of the present invention, in which contaminated water containing dissolved oxygen enters three typical reaction chambers representing three bacterial bioreactors, while dissolved oxygen enters at A. The oxygen is consumed as the bacteria catalyze the oxidation of phenol. The concentration of oxygen leading at B is therefore less, creating an oxygen-based chemical potential difference that establishes the potential field.

This method of design overcomes limitations that cause low and uneven catalyst distribution, limit over-all productivity, and are costly. In, for example, bacterial oxidation of phenol, three of many possible reactor configurations are shown in FIG. 1.

Potential fields are generated whether the catalyst, in this case bacteria, is free to move within the fluid, or it is immobilized as a film onto a biosupport sheet or within a gel such as alginate. The fluid may be any gas or liquid, such as water carrying the contaminant phenol. This fluid is not necessarily always in motion, but may alternatively be supplied in a batch or a series of batches and with the fluid velocity at times being zero. The support sheet may be a single sheet or several parallel, flat sheets, or a sheet or sheets are rolled into a spiral, or biosupport surfaces could be shaped into any desired configuration. Gel bead and other reactors are also eligible for this treatment.

Phenol is oxidized as the fluid, carrying dissolved atmospheric or added oxygen, flows past the bacteria. Oxygen is consumed, and carbon dioxide and intermediates are formed. The consumption of oxygen and formation of carbon dioxide result in differences in concentration of dissolved oxygen and carbon dioxide across the regions represented by lines A and B in FIG. 1.

This method and apparatus may, in addition to employing oxidation, may use other reaction systems such as, but not limited to, (1) anaerobic digestion to make methane and carbon dioxide, (2) yeast fermentation to produce alcohol and carbon dioxide and potential high protein foods, (3) immune system control reactions, (4) blood cell or tissue cell reactions, (5) enzyme reactions, (6) organelle reactions, (7) ordinary chemical systems, etc.

Nor is the present invention limited to self-immobilizing catalysts such as bacteria and free biocatalysts but may also use chemically and physically affixed biocatalysts. It is also applicable to reactions not requiring or no longer requiring catalytic reactants.

Figure 2:
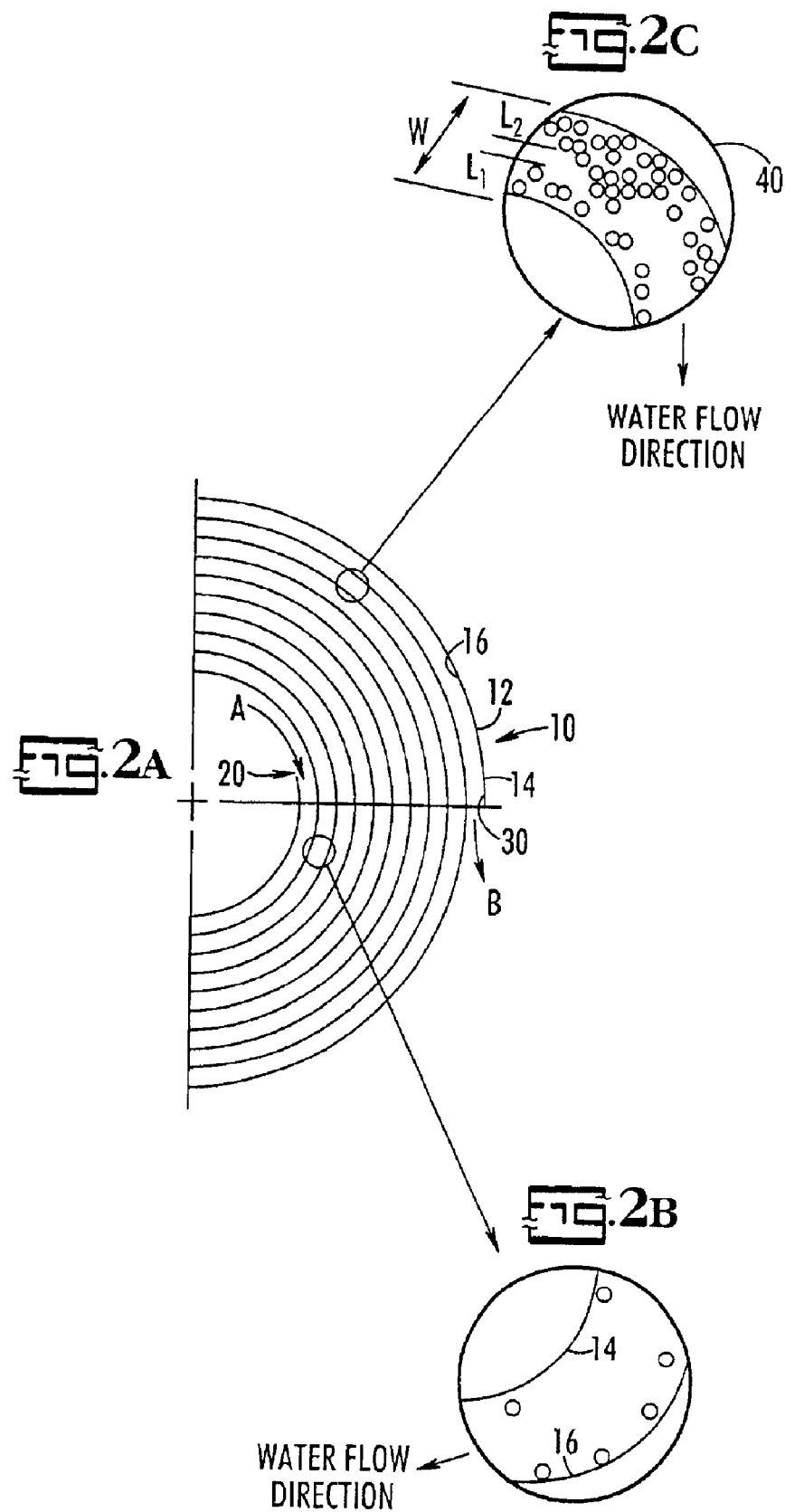
FIG. 2A is a schematic representation of a top view of a portion of the spiral cartridge embodiment of the present invention. The shows flow entering the core through the slit at A and exiting at B. Due to potential energy field buildup and bacterial motility, an uneven thickness tends to form within the walls of the chamber. In this case, the bacteria are shown to concentrate near the end (FIG. 2C, inset, left) of the flow path. Near the entrance, the density is shown to be light (FIG. 2B, inset, below). A high pressure drop for a given amount of bacteria, especially prevalent at the most densely packed section, leads to failure. Spacing width is W, and L=L1+L2, is the average thickness of immobilized bacteria.

FIG. 2A shows a spiral cartridge core 10 comprising a substrate in the form of a spiral sheet 12 configured to define a first, outer surface 14 and an opposing, second, inner surface 16. Flow enters at the center of the core at 20 and exits at the periphery at the core 30. The bacteria 40 are similarly injected at 20 and exit at 30. As shown in FIG. 2B, they start to accumulate on surfaces 14 and 16. Ultimately, they build up to coatings as shown in FIG. 2C where the coating on-surface 14 has a width L1, and the coating on surface 16 has a coating width L2, giving a spacing width W.

Figure 3:
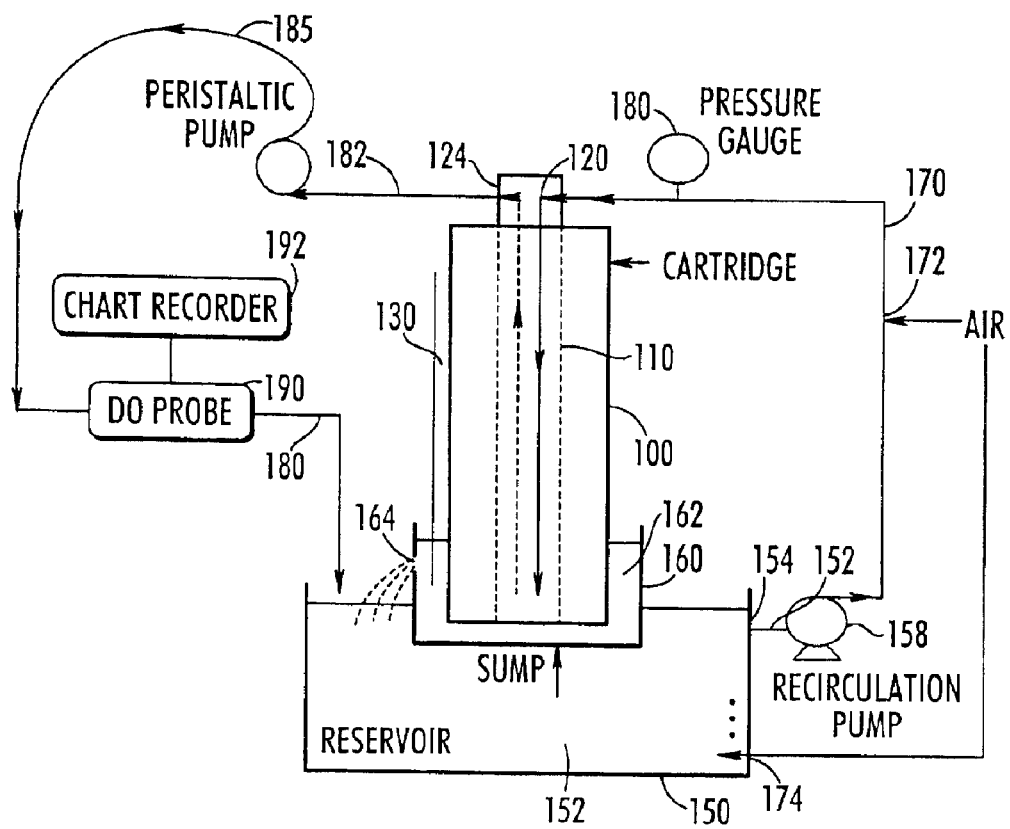
FIG. 3 is a schematic representation of a reaction system utilizing a spiral cartridge of the present invention.

The entire system is illustrated in FIG. 3. Here, the last two digits of the reference numbers indicate the same component as in FIG. 2 but are incremented by 100. Thus, the cartridge case 100 comprises the core 110. Bacteria, and later the liquid to be purified, are injected at the center of the core 120 and exit at 130 into sample 160 from whence surplus liquid 162 overflows through 164 to reservoir 150.

In order to sample inflow composition and pressure, etc., a sample is taken at 124 in the core of the cartridge and proceeds via conduit 182 to peristaltic pump 184 and from thence via conduit 185 to DO probe 190, whose readings are recorded by chart recorder 192. The flow continues from probe 190 through conduit 180 to reservoir 150 containing liquid 152.

The liquid in the reservoir exits through exit 154 via conduit 156 by means of recirculation pump 158 and is then recycled via conduit 170 to the 5 cartridge at 120. The pressure in 170 is measured by pressure gauge 180.

Air is injected into the system at point 172 in conduit 170 and into the reservoir at point 174.

Method of Calculating Amplification of Field Intensity

Table A demonstrates the 4-step calculation method for total intensity, I.

A baseline (at normal respiration) oxygen concentration drop measured as 20 nanomoles per ml (Sheng) is observed across the cartridge or the gel bead (FIG. 1). Let this equate to one Unit of field intensity, I. For convention, assume the direction of intensity is that of lower oxygen concentration.

The field intensity increases radially outward. Each time a complete wrap is made in the spiral cartridge, a new ring is generated. The intensity of each ring is approximately by 1 Units per cm times the average circumference, divided by the spacing, plus a similarly calculated amount for the field it shares with each of the other rings. This is summarized in Table B for the spiral cartridges.

The gel bead reactor displays major bed expansion at this $I_2$: 0.167 U/cm. The maximum acceptable $I_2$=0.24 U/cm. Therefore, the prior art cartridge $I_2$ is barely acceptable. Both present invention cartridges are easily acceptable.

Note also that the gel reactor is 11.5 cm diameter as described by Lakhwala, and is cylindrical. It does not wrap or coil to increase amplification. Spiral amplification calculations are given below in Table B.

TABLE B

Amplification Calculation

| Diam. - Spacing Biosupport Area | No. of Rings | Average I per Ring | Amplification = Average I per Ring × No. of Rings |
|---|---|---|---|
| Prior Art 5 in. dia., about 1/16 in. sp 50 sq. ft. | 25 | 5.84 | 146 |
| Present Invention 5 in. dia., 1/8 in. sp 22.5 sq. ft. | 11 | 3.28 | 36.1 |
| Present Invention 5 in. dia., 1/4 in. sp 18.8 sq. ft. | 8 | 2.00 | 16.0 |
| Present Invention 10 in. dia., 1/4 in. sp | 15 | 1.78 | 26.7 |

The above prior art cartridges are acceptable.

The calculation of amplification is simple enough to do by hand but is best done with the assistance of a programmed computer. The calculation begins by assuming that each sheet has a given, nominal potential electric field intensity, say, for example, 0.10 units/centimeter per five centimeter of sheet length, or 0.5 units. If the sheet is rolled into a single spiral, the intensity is forced into a smaller space around the core of the spiral. Let us say that the increase in diameter from the beginning of the spiral to the end of the spiral is 0.25 inches, then the intensity per inch is 0.5 units per 0.25 inches or 2 units/inch. The amplification is the ratio of the straight (uncoiled) intensity divided by the new coiled intensity, or 2 units divided by 0.5 units or 4.

A spiral cartridge is a series of such cores, each one amplified and each one affected by the others around it, analogous to the wraps of wire in a transformer or solenoid. A core is one 360 degree curve of a sheet, with the radius of the end (B) of the sheet, $r_2$, being greater than the radius at the beginning (A) of the sheet, $r_1$, by the thickness of the sheet and the spacing between the sheet's beginning radius and ending radius.

TABLE A

Example Application of the Design Method

| Description | Step | Formula | Example 1 Gel Beads | Example 2 Prior Art Cartridge | Example 3 Present Invention Cartridge | Example 4 Present Invention Cartridge |
|---|---|---|---|---|---|---|
| Measure reactor length, the distance from Point A at the entrance to point B at the exit of the reactor, as shown in FIG. 1 | 1 | L = B − A | 6 cm | 610 cm | 274 cm | 221 cm |
| Calculate initial field intensity | 2 | $I_1$ = 1.0/L Units/L | 0.167 U/cm | 0.00164 U/cm | 0.00365 U/cm | 0.00452 U/cm |
| Calculate amplification | 3 | X (see note 1) | 1.0 | 146 | 36.1 | 16.0 |
| Calculate total intensity, I | 4 | $I_2$ = $I_1$ xX | 0.167 U/cm | 0.239 U/cm | 0.132 U/cm | 0.0723 U/cm |

Set either the length of the sheet or the number of cores in the spiral. Then roll the sheet one core at a time, calculating the circumference of each sheet and the total sheet length (B–A). Stop rolling when either the total sheet length is reached or the desired number of cores is reached. Then a matrix is formed to store all the intensity numbers. For a ten core spiral, a 10×10 matrix is needed. The intensity in element i,j is the intensity of ring i on ring j. Where i=j, the intensity is as calculated above. Where i≠j, the intensity is the effect of ring i on that of ring j. These are determined by calculating outside and inside core effects. The following is an empirical approach to calculating these effects but one which is satisfactory to produce a reasonable result for design of a reactor.

To calculate the inside core or ring effects, divide the circumference of the remaining inside sheets by the core number away from the main core.

To calculate the outside core effect, determine the effect of each core on the main one by dividing the circumference of the remaining outside sheets by the core number away from the main core.

Field strength is the product of three factors: (1) the length of the circumference in question, (2) one intensity unit divided by the total length (B–A), and (3) the reciprocal of the sum of the thickness and spacing.

Next sum the intensities (field strengths, stored in the matrix) for each core to get the intensity per core for each core. Then sum the intensities for each core to obtain the total intensity. The average intensity per core is calculated by dividing the total intensity by the number of cores.

TABLE C

Comparison of Prior Art and Present Invention Cartridges

| | Loading g. bacteria | Bacteria Packing mg/cm$_2$ | Avg. I Units (I difference, high-low) | Oxidation Rate mg/hr/ft$_2$ |
|---|---|---|---|---|
| Prior Art: High Loading | 75 | 1.62 | 5.84 | 10(57) |
| Prior Art: Low Loading | 25 | 0.538 | (2.78) | |
| Present Invention: High Loading | 150 | 7.17 | 3.28 | 21(31) |
| Present Invention: Low Loading | 32.8 | 1.57 | (1.30) | |

The operating rate per unit of biosupport for the present invention cartridge is 2.1 times that of the prior art cartridge, as shown in Table C above.

Sometimes a reaction proceeds while the measured concentration difference appears to be zero. In that case, other indicators may be used, for example, the oxygen concentration reading at that rate. For oxidation, this phenomenon might be caused by the formation of circulating enzymes or auto-oxidizing intermediates.

EXAMPLE 1

A comparative test was carried out utilizing a standard prior art type cartridge in accordance with the patent of Goldberg and Chen, and a cartridge according to the present invention, not initially loaded with bacteria, having a wider spacing. The general parameters are set forth in Table D below. Both cartridges were run in a test system such as illustrated in FIG. 3. It should be noted with respect to Table D, that the designated "initially dry biomass" was actually measured after completion of the experiment.

The present invention cartridge was prepared in the following manner.

Aerated water was pumped through the cartridge system shown in FIG. 3, utilizing a cartridge with dimensions shown in Table D. The oxygen was measured at the reservoir which corresponds to the input location (A) of FIG. 1 and also at the sump which is output location (B) of FIG. 1.

Bacteria (screened activated sludge under 300 microns) were fed into the reservoir and circulation continued for between 1 and 12 hours under the flow conditions shown in Table D, until equilibration is reached. A plot is made showing the level of difference in oxygen levels between the input and the output against time.

The polarity of the system ran in the direction of reduced oxygen content. Varying amounts of containment, i.e., phenol, were fed into the system and the results set forth for the present invention cartridge on Table E and for the prior art cartridge on Table F.

TABLE D

Spiral Polymeric Sheet Cartridge

| Cartridge | Present Invention | Prior Art |
|---|---|---|
| Spacing (inch) | 1/8 (3.2 mm) | 1/16 (1.6 mm) |
| Height of sheet (ft) | 2.42 (29 inches) | 2.42 (29 inches) |
| Length of sheet (ft) | 9 | 20 |
| Size of sheet (ft$_2$) | 21.8 | 48.4 |
| Initial dry biomass (g) | 32.8 | 11.15 |
| Aeration | Yes | Yes |
| Recirculating water flow (liters/minute) | 11.36 (3 gpm) | <2 |
| Pressure (psi) | 3.5–7.0 | 7.5–25 (usually, 10 psi) |
| Water temperature (° C.) | 35–37 | 36–39 |
| Initial water volume in system (liters) | 70–90 | 40–44 |

TABLE E

Present Invention Cartridge
Size of sheet: 32.8 ft$^2$

| # of run | Amount of phenol (g) | Total water volume (L) | Conc. of phenol (mp/L) | Reaction time (hour) | Reaction rate (mg/hour) | Reactor capacity (mg/hr/ft$^2$) |
|---|---|---|---|---|---|---|
| # Phe-5 | 7.5 | 78.7 | 95 | 10.3 | 728 | 22 |
| # Phe-6 | 1.95 | 65 | 30 | 3.2 | 609 | 19 |
| # Phe-7 | 5.04 | 77 | 65 | 7 | 720 | 22 |
| # Phe-8 | 14.42 | 68 | 212 | 12.8 | 1127 | 34 |
| # Phe-9 | 5.18 | 81.8 | 63 | 5.2 | 992 | 30 |

TABLE E-continued

Present Invention Cartridge
Size of sheet: 32.8 ft^2

| # of run | Amount of phenol (g) | Total water volume (L) | Conc. of phenol (mp/L) | Reaction time (hour) | Reaction rate (mg/hour) | Reactor capacity (mg/hr/ft^2) |
|---|---|---|---|---|---|---|
| # Phe-10 | 0.56 | 64 | 9 | 1.8 | 311 | 9 |
| # Phe-11 | 1.2 | 51.5 | 20 | 1.7 | 706 | 22 |
| # Phe-12 | 3.07 | 76.6 | 40 | 3.3 | 930 | 28 |
| # Phe-13 | 5.2 | 65 | 80 | 5.2 | 1000 | 30 |
| # Phe-14 | 10.25 | 73.5 | 139 | 10.7 | 958 | 29 |
| # Phe-15 | 19.75 | 75.6 | 261 | 15.5 | 1274 | 39 |
| # Phe-16 | 32.2 | 92 | 350 | 22.7 | 1419 | 43 |
| # Phe-17 | 22.75 | 81.3 | 280 | 17.3 | 1315 | 40 |
| # Phe-18 | 3.02 | 94.35 | 32 | 20.2 | 150 | 5 |
| # Phe-19 | 10 | 105.8 | 95 | 13.25 | 755 | 23 |
| # Phe-20 | 20 | 81.84 | 244 | 49.1 | 407 | 12 |
| # Phe-21 | | | | | | |
| # Phe-22 | 10 | 108.9 | 92 | 14 | 714 | 22 |
| # Phe-23 | 10 | 83.9 | 119 | 14.25 | 702 | 21 |
| # Phe-24 | 10 | 84.4 | 118 | 19.45 | 514 | 16 |
| # Phe-25 | 7 | 79.8 | 88 | 8.9 | 787 | 24 |
| # Phe-26 | 13 | 81.8 | 159 | 20.6 | 631 | 19 |
| # Phe-27 | 10 | 92.2 | 108 | 24.4 | 410 | 12 |
| # Phe-28 | 10 | 100 | 100 | 17.1 | 585 | 18 |
| # Phe-29 | 20 | 75.6 | 265 | | | |
| # Phe-30 | 20 | 86.5 | 231 | | | |
| # Phe-31 | 10 | 75 | 133 | 30.4 | 329 | 10 |
| # Phe-32 | 10 | 87 | 115 | 21.2 | 472 | 14 |
| # Phe-33 | 5 | 82.9 | 60 | 9.75 | 513 | 16 |
| # Phe-34 | 10 | 75.9 | 132 | 29.2 | 342 | 10 |
| # Phe-35 | 1 | 79.8 | 13 | | | |
| # Phe-36 | 5 | 87 | 57 | 8.9 | 582 | 17 |
| # Phe-37 | 10 | 94.4 | 106 | | | |
| # Phe-38 | 10 | 83.4 | 120 | 36 | 278 | 8 |
| # Phe-39 | 10 | 75.6 | 132 | 17.75 | 563 | 17 |
| # Phe-40 | 17.1 | 85.5 | 200 | 40.08 | 427 | 13 |
| | | | | Total (31 runs): | | 847 |
| | | | | Average (mg/hour/ft^2) | | 21 |

TABLE F

Prior Art Cartridge
Size of sheet: 48.4 ft^2

| # of run | Amount of phenol (g) | Total water volume (L) | Conc. of phenol (mg/L) | Reaction time (hour) | Reaction rate (mg/hour) | Reactor capacity (mg/hr/ft^2) |
|---|---|---|---|---|---|---|
| # - 5 | 5 | 35.7 | 140 | 9.2 | 543 | 11 |
| # - 6 | 5 | 50.3 | 99 | 11.5 | 435 | 9 |
| # - 8 | 10 | 33.98 | 294 | 36.8 | 272 | 6 |
| # - 12 | 5 | 37.8 | 132 | 7.8 | 641 | 13 |
| # - 25 | 10 | 31.2 | 321 | 12.8 | 781 | 16 |
| # - 26 | 10 | 40 | 250 | 12.3 | 813 | 17 |
| # - 27 | 7.5 | 38 | 197 | 8.2 | 915 | 19 |
| # - 28 | 15 | 42.3 | 355 | 25.1 | 598 | 12 |
| # - 29 | 15.01 | 43.3 | 347 | 35 | 429 | 9 |
| # - 30 | 2.5 | 36.4 | 69 | 4.5 | 556 | 11 |
| # - 31 | 15 | 38.1 | 394 | 29.75 | 504 | 10 |
| # - 33 | | | | | | |
| # - 37 | 5 | | | 15.75 | 317 | 7 |
| # - 38 | 2.5 | 42.65 | 59 | 6.7 | 373 | 8 |
| # - 40 | 2.5 | 43.34 | 58 | 5.3 | 472 | 10 |
| # - 41 | 1 | 42.65 | 23 | 2.75 | 364 | 8 |
| # - 42 | 1 | 46.11 | 22 | 2.25 | 444 | 9 |
| # - 43 | 1 | 42.65 | 23 | 2 | 500 | 10 |
| # - 44 | 1 | 42.99 | 23 | 1.4 | 714 | 15 |
| # - 45 | 1 | 42.99 | 23 | 1.3 | 769 | 16 |
| # - 46 | 1.5 | 43.69 | 34 | 2 | 750 | 15 |
| # - 47 | 1 | 42.65 | 23 | 1.5 | 667 | 14 |
| # - 48 | 1.5 | 43.69 | 34 | 1 | 1500 | 61 |
| # - 49 | 1.5 | 42.65 | 35 | 2.2 | 682 | 14 |
| # - 50 | 1.5 | 42.65 | 35 | 1.9 | 789 | 16 |
| # - 51 | 1.5 | 43.34 | 35 | 1.7 | 882 | 18 |

TABLE F-continued

Prior Art Cartridge
Size of sheet: 48.4 ft^2

| # of run | Amount of phenol (g) | Total water volume (L) | Conc. of phenol (mg/L) | Reaction time (hour) | Reaction rate (mg/hour) | Reactor capacity (mg/hr/ft^2) |
|---|---|---|---|---|---|---|
| # - 52 | 5 | 42.65 | 117 | 5.75 | 870 | 18 |
| # - 53 | 0.5 | | | | | |
| # - 54 | 0.5 | | | | | |
| # - 55 | 0.5 | | | | | |
| # - 56 | 0.5 | | | | | |
| # - 57 | 0.5 | | | | | |
| # - 58 | 1.5 | | | | | |
| # - 60 | 5 | 43.34 | 115 | 25.3 | 198 | 4 |
| # - 61 | 5 | 43.34 | 115 | 19 | 263 | 5 |
| # - 63 | 5 | 43.3 | 115 | 23.6 | 212 | 4 |
| # - 64 | 5 | 45 | 111 | 8.3 | 602 | 12 |
| # - 65 | 2 | 43.6 | 46 | 3.7 | 541 | 11 |
| # - 66 | 1.5 | 43.6 | 34 | 2.8 | 536 | 11 |
| # - 67 | 2.5 | 43.6 | 57 | 4.8 | 521 | 11 |
| # - 68 | 2 | 43.6 | 46 | 4.2 | 476 | 10 |
| # - 71 | 2.5 | 43.67 | 57 | 4.9 | 510 | 11 |
| # - 73 | 5 | 43.69 | 114 | 12 | 417 | 9 |
| # - 75 | 2 | 43.69 | 46 | 5.3 | 377 | 8 |
| # - 77 | 1.5 | 43.69 | 34 | 4.1 | 386 | 8 |
| # - 78 | 1 | 43.69 | 23 | 2.7 | 370 | 9 |
| # - 79 | 2.5 | 43.69 | 57 | 6.7 | 373 | 9 |
| # - 81 | 2.5 | 43.34 | 58 | 6.4 | 391 | 6 |
| # - 83 | 5 | 43.34 | 115 | 8.4 | 595 | 12 |
| # - 84 | 2 | 43.6 | 46 | 4.1 | 488 | 10 |
| # - 85 | 5 | 43.34 | 115 | 12.2 | 410 | 8 |
| # - 86 | 5 | 43.34 | 115 | 17.3 | 289 | 6 |
| # - 88 | 2.5 | 43.34 | 58 | 9.25 | 270 | 6 |
| # - 89 | 1.5 | 43.34 | 35 | 7.5 | 200 | 4 |
| # - 90 | 5 | 43.34 | 115 | 32.9 | 152 | 6 |
| # - 91 | 2.5 | 43.34 | 58 | 8.1 | 309 | 6 |
| # - 92 | 1.5 | 43.34 | 35 | 4.9 | 306 | 6 |
| # - 93 | 2.5 | 43.34 | 58 | 7.9 | 316 | 7 |
| # - 94 | 2.5 | 43.34 | 58 | 7 | 357 | 7 |
| # - 95 | 2 | 43.69 | 46 | 5.5 | 364 | 8 |
| # - 96 | 1.5 | 43.34 | 35 | 4.75 | 316 | 7 |
| # - 97 | 5 | 43.34 | 115 | 20.7 | 242 | 5 |
| # - 98 | 2.5 | 43.34 | 58 | 14.25 | 175 | 4 |
| # - 99 | 2 | 43.34 | 46 | 11 | 182 | 4 |
| | | | | Total (57 runs): | | 572 |
| | | | | Average (mg/hour/ft^2) | | 10 |

From these results, it may be seen that because the packing density of bacteria in the present invention cartridge system is 4.4 times higher than that in the prior art cartridge, the operating rate per square foot of power support for the present invention cartridge to 2.1 times that of the prior art cartridge.

EXAMPLE 2

A bioreactor according to the present invention was tested to see the effectiveness of this system at cleaning indoor air in auto service stations. The air quality in auto service stations is very poor due to high ambient concentrations of hydrocarbons, particulate matter, $NO_x$ and carbon monoxide (CO).

Using normal air filters to remove air contaminants is ineffective because it fails to destroy hydrocarbons. Venting garages to the atmosphere is also a poor choice because the odor becomes a public nuisance in neighborhoods. Also emissions from auto service stations soon may fall under regulation by the EPA.

A bioreactor according to the present invention was used for the indoor air treatment. This bioreactor oxidizes hydrocarbons that pass through the reactor and thus they may be (and often are) oxidizing a much greater hydrocarbon load than is indicated by the analytes of interest. Any particulate matter, such as brake dust, tire dust, and cigarette smoke is also absorbed into the basin of the bioreactor.

To clean the air, the bioreactor was operated continuously at 65 cfm. To test the percent conversion of the bioreactor, a three-foot tube was placed at the inlet to allow proper mixing to take place. A similar tube was placed at the outlet of the reactor. An open container of gasoline was placed at the inlet of the reactor. The inlet concentration (ppm) was probed at the inlet, then measured at the outlet.

This test was performed at three different concentration regimes: high, medium and low. The results are provided in Tables G, H, and J.

TABLE G

Single pass destruction of gasoline vapors at high concentrations.

| Time (min. from start) | HC (ppm) In | HC (ppm) Out | % removal HC |
|---|---|---|---|
| 0 | 2727 | 887 | 67 |
| 1 | 2867 | 921 | 68 |
| 2 | 2963 | 858 | 71 |

TABLE G-continued

Single pass destruction of gasoline vapors at high concentrations.

| Time (min. from start) | HC (ppm) In | HC (ppm) Out | % removal HC |
|---|---|---|---|
| 3 | 2895 | 796 | 73 |
| 4 | 2667 | 884 | 67 |
| 5 | 2679 | 827 | 69 |
| 6 | 2628 | 722 | 73 |
| 8 | 2517 | 784 | 69 |
| 12 | 2693 | 710 | 74 |

TABLE H

Single pass destruction of gasoline vapors at medium concentrations.

| Time (min From start) | HC (ppm) In | HC (ppm) Out | % removal HC |
|---|---|---|---|
| 0 | 1064 | 748 | 30 |
| 3 | 1068 | 705 | 34 |
| 5 | 1066 | 692 | 35 |
| 6 | 1043 | 681 | 35 |
| 7 | 1037 | 640 | 38 |
| 8 | 963 | 623 | 35 |
| 9 | 1001 | 603 | 40 |
| 10 | 901 | 580 | 36 |
| 11 | 910 | 589 | 35 |

TABLE J

Single pass destruction of gasoline vapors at low concentrations.

| Time (min From start) | HC (ppm) In | HC (ppm) Out | % removal HC |
|---|---|---|---|
| 0 | 262 | 203 | 23 |
| 1 | 229 | 189 | 17 |
| 2 | 222 | 187 | 16 |
| 4 | 222 | 195 | 12 |
| 5 | 235 | 211 | 10 |
| 10 | 272 | 243 | 11 |
| 11 | 318 | 261 | 18 |
| 12 | 373 | 299 | 20 |
| 13 | 340 | 285 | 16 |
| 14 | 349 | 273 | 22 |

A second study was done to monitor the effectiveness of a bioreactor according to the present invention at destroying car exhaust. In this study car exhaust was piped directly into the inlet tube of the bioreactor and monitored at the inlet and outlet. In this study the concentrations of hydrocarbons was studied as well as the concentrations of carbon monoxide and $NO_x$. The results are presented in Table K below.

TABLE K

Single pass destruction of automobile emissions.

| Elapsed Time (Min.) | HC (ppm) In | HC (ppm) Out | % Removal HC | CO % In | CO % Out | % Removal CO | NOX (ppm) In | NOX (ppm) Out | % Removal NOX |
|---|---|---|---|---|---|---|---|---|---|
| 1 | 201 | 133 | 34 | 0.16 | 0.15 | 16 | 12 | 11 | 8 |
| 2 | 130 | 81 | 38 | 0.23 | 0.19 | 27 | 10 | 8 | 20 |
| 3 | 95 | 48 | 49 | 0.26 | 0.2 | 24 | 8 | 6 | 25 |
| 5 | 82 | 43 | 48 | 0.3 | 0.21 | 27 | 7 | 6 | 14 |
| 6 | 63 | 43 | 32 | 0.27 | 0.22 | 20 | 6 | 5 | 17 |
| 8 | 64 | 42 | 34 | 0.28 | 0.23 | 24 | 5 | 4 | 20 |
| 11 | 59 | 32 | 46 | 0.29 | 0.25 | 24 | 5 | 4 | 20 |
| 13 | 54 | 33 | 39 | 0.29 | 0.22 | 25 | 4 | 3 | 25 |

A bioreactor according to the present invention used to destroy indoor air pollution is required to be effective against a wide range of pollutants. By destroying the hydrocarbons, it removes harmful contaminants in the air forever. Since the bioreactor is a small stand alone unit with a small footprint, it is less expensive than units which are incorporated into the ductwork of the building. Also the operating cost of the present bioreactor is far lower than that of filtering technologies.

The efficiency of pollution destruction per pass by the present bioreactor increases as the concentration of contaminants in the stream is increased. Thus, a bioreactor according to the present invention is most effective at cleaning gasoline spills and heavy loads of hydrocarbons. Also, the present bioreactor is effective at removing CO and $NO_x$, which are harmful to breathe, from the air in auto service stations.

EXAMPLE 3

In another example, a bioreactor according to the present invention was applied to the production of ethanol and $CO_2$ from sugar to compare its productivity to that of a conventional gel bead reactor. The results are summarized in Table L.

TABLE L

COMPARISON OF PRIOR ART BIOREACTOR WITH PRESENT INVENTION IN PRODUCING $CO_2$ AND ETHANOL FROM SUGAR

| Step | Example 1 Prior Art Gel Bead Reactor | Example 2 Bioreactor Reactor According to Present Invention |
|---|---|---|
| 1 (B-A) | 12.7 cm | 610 cm |
| 2 I | 0.07874 | 0.00164 |
| 3 Amplification | 1.0 | 26.7 |
| 4 Total I | 0.0787 | 0.0438 |
| 5 Total Productivity in mg of ethanol per gram of yeast per hour | 45 | 616 |

The results of Example 1 in Table L are from "Flow Rate and Bead Size as Critical Parameters for Immobilized Yeast Reactors" in Enzyme and Microbial Technology, Vol. 7, November 1985, p 538–542, from table 3, page 541. These results demonstrate the greater effectiveness of the present design.

Those skilled in the low reactors will understand that many modifications and substitutions can be made to the foregoing preferred embodiments without departing from the spirit and scope of the present invention.

What is claimed is:

1. A bioreactor for processing a reagent, said bioreactor comprising:
   a sheet of material having a surface and defining a flow pathway, said sheet of material being formed into a spiral made of sequential turns, said flow pathway having a beginning and an opposing end and a spacing between sequential turns of said spiral, wherein said spacing is at least $1/8^{th}$ inch;
   biocatalyst reactant particles, said reactant particles selected to react with a reagent and become polarized as a result;
   a feedstock; and
   means for flowing said reactant particles, said feedstock, and said reagent through said flow pathway from said beginning to said end, said reactant particles and said reagent reacting when said reactant particles and said reagent flow along said flow pathway with said feedstock, whereby said reactant particles become and generate an energy potential difference between said beginning of said flow pathway and said end such that said reactant particles directly to said surface.

2. The bioreactor as recited in claim 1, wherein said reactant particles are made of a aerobic biocatalyst.

3. The bioreactor as recited in claim 1, wherein said reactant particles are selected from the group consisting of enzymes, bacteria, organelles, yeasts, leucocytes, hemocytes and fungi.

4. The bioreactor as recited in claim 1, wherein said feedstock selected from the group consisting of air and water.

5. The bioreactor as recited in claim 1, wherein said feedstock includes said reagent.

6. The bioreactor as recited in claim 1, wherein said reactant particles are bacteria and said reagent is an oxidizing agent.

7. The bioreactor as recited in claim 1, wherein said reactant particles are aerobic bacteria and said reagent is oxygen.

8. The bioreactor as recited in claim 1, wherein said reactant particles are activated sludge.

9. A method for processing a reagent, said method comprising the steps of:
   providing a sheet of material formed into a spiral having sequential turns, said spiral defining a flow pathway having a beginning and an opposing end and a spacing of at least $1/8^{th}$ inch between said sequential turns;
   feeding a feedstock and a reagent into said flow pathway at said beginning; and
   feeding biocatalyst reactant particles, known to react with said reagent and become polarized, into said flow pathway at said beginning, whereby said reactant particles react with said reagent as said reactant particles and said reagent flow along said flow pathway from said beginning to said end, and said reactant particles become polarized and generate an energy potential difference between said beginning of said flow pathway and said end such that said reactant particles attach directly on said sheet of material.

10. The method of claim 9, wherein said sheet of material has a surface and wherein said reactant particles and said reagent are fed into said bioreactor until said surface is coated with plural layers of said reactant particles.

11. The method as recited in claim 9, wherein said reactant particles are made of a aerobic biocatalyst.

12. The method as recited in claim 9, wherein said reactant particles are selected from the group consisting of enzymes, bacteria, organelles, yeasts, leucocytes, hemocytes and fungi.

13. The method as recited in claim 9, wherein said feedstock is aqueous.

14. The method as recited in claim 9, wherein said feedstock includes said reagent.

15. The method as recited in claim 9, wherein said reactant particles are bacteria and said reagent is an oxidizing agent.

16. The method as recited in claim 9, wherein said reactant particles are aerobic bacteria and said reagent is oxygen.

17. The method as recited in claim 9, wherein said reactant particles are activated sludge.

* * * * *